(12) United States Patent
McManus et al.

(10) Patent No.: US 7,642,208 B2
(45) Date of Patent: Jan. 5, 2010

(54) ABRASION RESISTANT MATERIAL FOR USE IN VARIOUS MEDIA

(75) Inventors: Jeffrey Lawrence McManus, Canton, GA (US); David Grant Midkiff, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/638,862

(22) Filed: Dec. 14, 2006

(65) Prior Publication Data

US 2008/0142433 A1   Jun. 19, 2008

(51) Int. Cl.
*B32B 5/26* (2006.01)
*D04H 1/00* (2006.01)

(52) U.S. Cl. .................. 442/382; 442/381; 442/361; 442/362; 442/363; 442/364; 442/365; 428/296.7

(58) Field of Classification Search ......... 442/361–365, 442/381, 382, 400, 401
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,538 A | 3/1970 | Petersen | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,959,421 A | 5/1976 | Weber et al. | |
| 4,041,203 A | 8/1977 | Brock et al. | |
| 4,100,324 A | 7/1978 | Anderson et al. | |
| 4,215,682 A | 8/1980 | Kubik et al. | |
| 4,315,881 A | 2/1982 | Nakajima et al. | |
| 4,340,563 A | 7/1982 | Appel et al. | |
| 4,375,718 A | 3/1983 | Wadsworth et al. | |
| 4,451,589 A | 5/1984 | Morman et al. | |
| 4,588,537 A | 5/1986 | Klaase et al. | |
| RE32,171 E | 6/1986 | van Turnhout | |
| 4,592,815 A | 6/1986 | Nakao | |

(Continued)

FOREIGN PATENT DOCUMENTS

EP   1041180 A1   10/2000

(Continued)

OTHER PUBLICATIONS

Description of various telomers and methods described in Encyclopedia of Polymer Science and Engineering, vol. 16, p. 494-554 (1989).

(Continued)

*Primary Examiner*—Lynda Salvatore
(74) *Attorney, Agent, or Firm*—Dority & Manning, P.A.

(57) ABSTRACT

A composite polymeric material is provided that may be used to construct an abrasion resistant layer or sheet such as an abrasion resistant meltblown layer. Desirably, the composite polymeric material comprises blends of syndiotactic and isotactic polypropylene with ferroelectric materials. The composite polymeric material is particularly useful for constructing a filter media comprising an abrasion resistant fine fiber layer such as a nonwoven layer. The composite polymeric material of the present invention also allows for electret treatment to improve its filtration characteristics.

23 Claims, 1 Drawing Sheet

U.S. PATENT DOCUMENTS

| | | | |
|---|---|---|---|
| 4,626,263 | A | 12/1986 | Inoue et al. |
| 4,969,457 | A | 11/1990 | Hubbard et al. |
| 5,188,885 | A | 2/1993 | Timmons et al. |
| 5,213,881 | A | 5/1993 | Timmons et al. |
| 5,336,552 | A | 8/1994 | Strack et al. |
| 5,350,624 | A | 9/1994 | Georger et al. |
| 5,382,400 | A | 1/1995 | Pike et al. |
| 5,401,446 | A | 3/1995 | Tsai et al. |
| 5,409,766 | A | 4/1995 | Yuasa et al. |
| 5,418,045 | A | 5/1995 | Pike et al. |
| 5,460,007 | A | 10/1995 | Reed et al. |
| 5,482,765 | A | 1/1996 | Bradley et al. |
| 5,597,645 | A | 1/1997 | Pike et al. |
| 5,635,134 | A | 6/1997 | Bourne et al. |
| 5,649,925 | A | 7/1997 | Barbera Alacreu |
| 5,652,048 | A | 7/1997 | Haynes et al. |
| 5,709,735 | A | 1/1998 | Midkiff et al. |
| 5,714,256 | A * | 2/1998 | DeLucia et al. ............. 428/373 |
| 5,721,180 | A | 2/1998 | Pike et al. |
| 5,721,883 | A | 2/1998 | Katsuo et al. |
| 5,736,465 | A | 4/1998 | Stahl et al. |
| 5,800,866 | A | 9/1998 | Myers et al. |
| 5,817,415 | A | 10/1998 | Chou et al. |
| 5,855,784 | A | 1/1999 | Pike et al. |
| 5,873,968 | A | 2/1999 | Pike et al. |
| 5,891,940 | A | 4/1999 | Chen et al. |
| 6,090,731 | A | 7/2000 | Pike et al. |
| 6,162,535 | A | 12/2000 | Turkevich et al. |
| 6,573,205 | B1 | 6/2003 | Myers et al. |
| 6,649,547 | B1 * | 11/2003 | Arnold et al. ................ 442/345 |
| 6,759,356 | B1 | 7/2004 | Myers |
| 6,858,551 | B1 * | 2/2005 | Turkevich et al. ........... 442/414 |
| 6,893,990 | B2 | 5/2005 | Myers et al. |
| 7,122,601 | B2 | 10/2006 | Musgrave et al. |
| 2003/0049477 | A1 | 3/2003 | Morizono et al. |
| 2004/0198124 | A1 | 10/2004 | Polanco et al. |
| 2005/0098256 | A1 | 5/2005 | Polanco et al. |
| 2006/0058464 | A1 | 3/2006 | Musgrave et al. |
| 2006/0241254 | A1 | 10/2006 | Razavi |

FOREIGN PATENT DOCUMENTS

| | | |
|---|---|---|
| EP | 1041181 A1 | 10/2000 |
| WO | WO 95/13856 | 5/1995 |
| WO | WO 97/23246 | 7/1997 |

OTHER PUBLICATIONS

Air Permeable Measurements: Federal Test Standard No. 191A, Method 5450 dated Jul. 20, 1978.

Abstract of Japanese Patent No. JP11012399, Jan. 19, 1999.

Search Report and Written Opinion for PCT/IB2007/053958 dated Sep. 15, 2008.

* cited by examiner

ABRASION RESISTANT MATERIAL FOR USE IN VARIOUS MEDIA

BACKGROUND OF THE INVENTION

In addition to a variety of other applications, nonwovens are very useful for creating filter media. Such nonwoven webs include meltblown fiber webs and spunbond fiber webs. By way of example, U.S. Pat. No. 5,460,007 to Midkiff et al. discloses the use of a nonwoven web for HVAC (heating, ventilating and air-conditioning) and other air filtration media. PCT Application No. US94/12699 (Publication No. WO95/13856) discloses high-loft multicomponent fiber webs suitable for use in a variety of air filtration applications. Additionally, U.S. Pat. No. 5,855,784 to Pike et al. discloses a variety of conjugate fiber nonwoven webs suitable for use as air and/or liquid filtration media. Further, multilayer laminates have likewise been used in a variety of filtration and/or filtration-like applications as discussed, for example, in U.S. Pat. No. 5,721,180 to Pike et al. and U.S. Pat. No. 4,041,203 to Brock et al.

Filter media fabricated from meltblown fiber webs tend to provide high filtration efficiency because of the fine fiber size and the conformability of meltblown fibers that causes the fibers to come together as a dense, fine-pored web. The resulting interfiber pore structures are highly suitable for mechanically trapping or screening fine particles. Additionally, the efficacy of various materials as filtration media, including meltblown fibers, can be improved when such is permanently, electrostatically treated, such as by applying a high-voltage electric field to the material. The resulting electret can be particularly suitable for the filtration of aerosols. A dielectric becomes an electret when the rate of decay of the field-induced polarization can be slowed down so much that a significant fraction of the polarization is preserved long after the polarizing field has been removed. Such electrets can be made by various methods, e.g. corona charging, triboelectric charging (friction) and so forth. By way of example, methods of treating various materials such as meltblown fibers in order to impart an electrostatic charge are described in U.S. Pat. No. 4,215,682 to Kubic et al., U.S. Pat. No. 4,375,718 to Wadsworth et al., U.S. Pat. No. 4,588,537 to Klaase et al. and U.S. Pat. No. 5,401,446 to Tsai et al, which are incorporated by reference. Improvements in creating electret materials are disclosed in U.S. Pat. No. 6,573,205 to Myers et al. and U.S. Pat. No. 6,893,990 to Myers et al., which are also incorporated here by reference.

Unfortunately, meltblown fiber webs typically do not have a physical integrity that is self-supporting and such are susceptible to delamination and abrasive forces during handling and converting. The structural integrity of such webs can be improved by increasing the basis weight or thickness of the web, and protection from abrasion and delamination can be achieved by incorporating the meltblown fibers inside a spunbonded portion of the filter media. However, increasing the basis weight or thickness exacerbates the pressure drop across the filter media. Furthermore, adding support structure or incorporating the meltblown fibers inside a spunbonded portion for protection from abrasive forces does not typically contribute to the filtration process and generally increases the production cost of the filter media. Additionally, the complexity of manufacturing a filter media from meltblown fiber webs has heretofore been further complicated by the time during which the meltblown fibers remain tacky or adherent. Attempting to wind or roll meltblown fibers while such remain adherent can lead to problems such as meltblown fibers sticking together as the material is wound onto a roll, which is sometimes referred to as blocking the roll of materials.

Accordingly, a need exists for a material that can be used to construct, for example, porous media that is resistant to delamination and abrasive forces during handling and converting. A need also exists for such a material that can be also be used to construct a filter media without the necessity of multiple structural support layers or unnecessary pressure drop across the media. A filter media that can also be wound or further processed relatively quickly after manufacture without concerns for blocking would be beneficial.

SUMMARY OF THE INVENTION

In accordance with one exemplary embodiment of the present invention, a filtration media is provided having a support layer and an exterior layer. The exterior layer is adhered to the support layer. The exterior layer is constructed from a polymeric matrix that comprises a first polymer component. The first polymer component comprises syndiotactic polypropylene and isotactic polypropylene. The syndiotactic polypropylene is present in the polymeric matrix in an amount from about 30 percent to about 90 percent by weight of the matrix. The polymer matrix may further comprise a second polymer component, wherein the second polymer component comprises a telomer having at least one functional end group. A ferroelectric material may be dispersed throughout the polymeric matrix in an amount of between about 0.01% and about 50% by weight of the matrix. The weight ratio of the syndiotactic polypropylene to the isotactic polypropylene in the polymeric matrix is at least about 1 to 1 and, even more desirably, at least about 1.5 to 1.

In another exemplary embodiment of the present invention, an electret material is provided comprising a porous sheet having an electrostatic charge. The porous sheet comprises a polymeric matrix of a first polymer component and a second polymer component. The first polymer component comprises syndiotactic polypropylene and isotactic polypropylene in a weight ratio of at least about 1 to 1. The second polymer component comprises a telomer having at least one functional end group. A ferroelectric material is dispersed throughout the polymeric matrix. By way of example only, the electret material may be used to construct face masks, sterilization wraps, dust wipes, and filtration media.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended drawing in which.

DETAILED DESCRIPTION OF REPRESENTATIVE EMBODIMENTS

Figure 1:
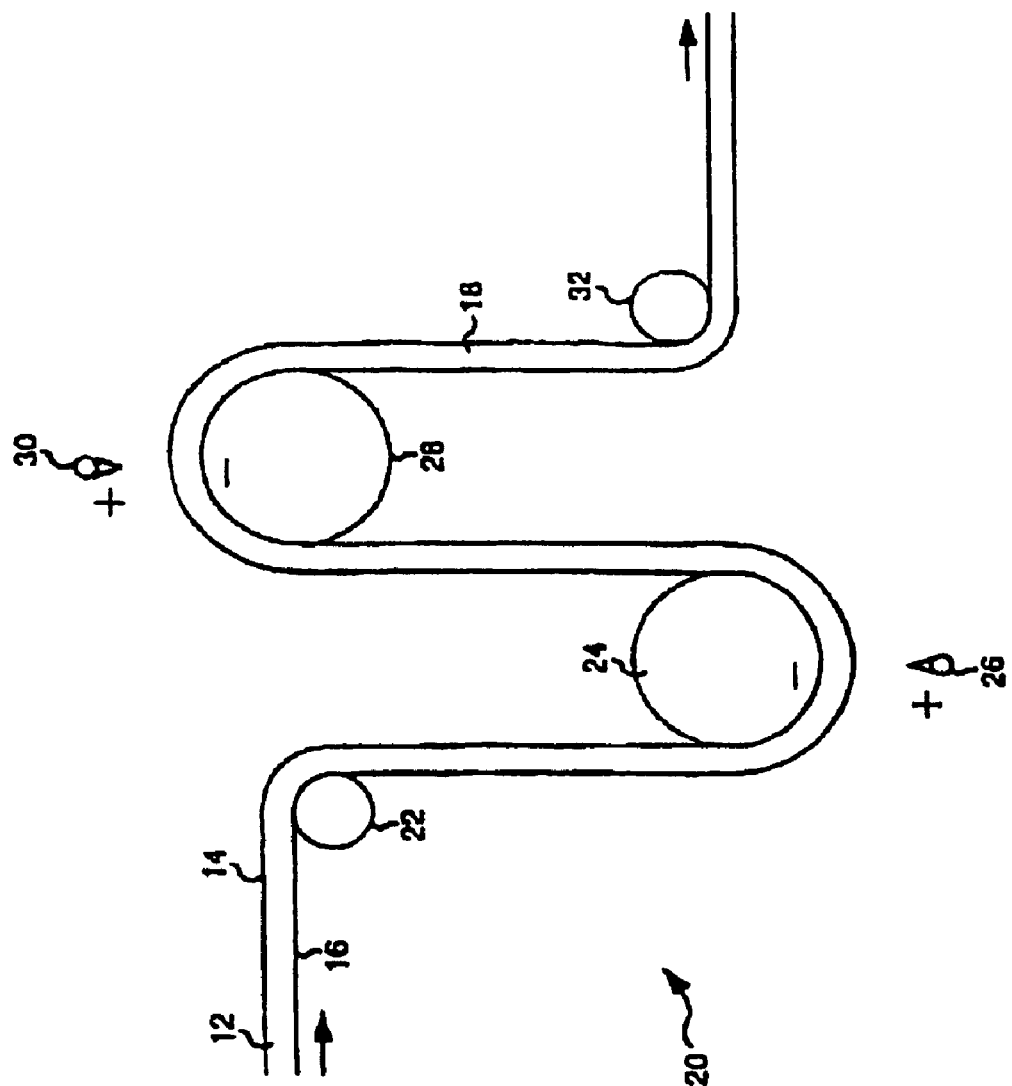
FIG. 1 is a schematic illustration of a process that may be used for electret treating polymeric materials.

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "nonwoven web" refers to a web having a structure of individual fibers that are randomly interlaid, not in an identifiable manner as in a knifted fabric. Nonwoven webs include, for example, meltblown webs, spunbond webs, carded webs, wet-laid webs, airlaid webs, coform webs, hydraulically entangled webs, etc. Fibers forming the webs or fabrics can have geometric, non-geometric and/or irregular shapes.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Meltblown processes are disclosed, for example, in U.S. Pat. No. 3,849,241 to Buntin et al., U.S. Pat. No. 5,721,883 to Timmons et al.; U.S. Pat. No. 3,959,421 to Weber et al., U.S. Pat. No. 5,652,048 to Haynes et al., U.S. Pat. No. 4,100,324 to Anderson et al., and U.S. Pat. No. 5,350,624 to Georger et al. The entire content of the aforesaid patents are incorporated herein by reference. Optionally, the nonwoven web can be cooled immediately following extrusion or formation upon a forming surface. By way of example only, meltblown fiber webs having a basis weight from about 14-170 grams per square meter ($g/m^2$) and even more desirably between about 17 $g/m^2$ and about 136 $g/m^2$ are particularly well suited for use as filtration media. Additionally, meltblown fiber webs having small average fiber diameter and pore size, such as those described in U.S. Pat. No. 5,721,883 to Timmons et al., are particularly well suited for use in filtration applications.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference. Spunbond filaments are generally not tacky when they are deposited onto a collecting surface. By way of example, spunbond filaments may sometimes have diameters less than about 40 micrometers, and are often between about 5 to about 20 micrometers. Spunbond fiber webs particularly well suited for use as filtration media are described in U.S. Pat. No. 5,709,735 to Midkiff et al., U.S. Pat. No. 5,597,645 to Pike et al., U.S. Pat. No. 5,855,784 to Pike et al., PCT Application No. US94/12699 (Publication No. WO95/13856) and PCT Application No. US96/19852 (Publication No. WO97/23246). The entire content of the aforesaid references are incorporated herein by reference.

As used herein, the term syndiotactic polypropylene will be understood to include both pure syndiotactic polypropylene homopolymers and syndiotactic polypropylene copolymers containing less than about 1 wt % of various alpha olefins. In general, the term syndiotactic polypropylene can be used to refer to a tacticity in which the methyl groups alternate on opposite sides along the polymer chain. By way of example, syndiotactic polypropylene homopolymers are formed by the catalyzed polymerization of a mixture of propylene monomer. The syndiotactic polypropylene homopolymer may be catalyzed using a Zeigler-Natta catalyst as is known in the art. However, syndiotactic polypropylene copolymers having less than about 1 wt % of ethylene behave very much like 100 wt % syndiotactic polypropylene homopolymers in regard to most physical properties. Thus, as used herein, syndiotactic polypropylene can include syndiotactic polypropylene homopolymers and random copolymers of syndiotactic polypropylene homopolymers having a very small amount of ethylene, i.e., less than about 1 wt % of the total. By way of example, for the present invention, the syndiotactic polypropylene preferably has a density of from about 0.87 to about 0.89 g/cc; a melt flow rate of from about 2 to about 20 g/10 min (ASTM D-1238), and a polydispersity index in the range from about 2.2 to about 3.5. An example of a commercially available syndiotactic polypropylene is FINAPLAS 1751 from Atofina Petrochemicals of LaPorte, Tex. FINAPLAS 1751 has a melt flow rate of about 20 g/10 min.

As used herein, the term isotactic polypropylene will be understood to include both pure isotactic polypropylene homopolymers and isotactic polypropylene copolymers containing less than about 1 wt % of various alpha olefins. In general, the term isotactic polypropylene homopolymer can be used to refer to a tacticity in which the methyl groups are on the same sides along the polymer chain. As used herein, isotactic polypropylene can include isotactic polypropylene homopolymers and random copolymers of isotactic polypropylene homopolymers having a small amount of other alpha olefins. By way of example, for the present invention, the isotactic polypropylene preferably has a density of from about 0.8 to about 1.0 g/cc; a melt flow rate of from about 34 to about 38 g/10 min (ASTM D-1238), and a weight average molecular weight distribution of less than about 3. An example of a commercially available isotactic polypropylene is PP3155 from the ExxonMobil Chemical Company of Houston, Tex. PP3155 has a melt flow rate of about 36 g/10 min, a density of about 0.9 g/cc, and molecular weight distribution of less than about 3.

Detailed Description

Generally speaking, the present invention is directed to a composite polymeric material that may be used to construct an abrasion resistant layer or sheet such as an abrasion resistant meltblown layer. Desirably, the composite polymeric material comprises blends of syndiotactic and isotactic polypropylene and ferroelectric materials. The composite polymeric material is particularly useful for constructing a filter media comprising an abrasion resistant fine fiber layer such as a meltblown layer. Such meltblown layer exhibits a relatively short open time and also provides the fine pore structure necessary for a filtration capable media. The composite polymeric material of the present invention also allows the meltblown layer to be constructed as an electret. For example, the composite polymeric material of the present invention may be used to construct a filter media comprising an abrasion resistant meltblown layer, which may be applied to a previously formed spunbond layer. The meltblown layer is sufficiently resistant to abrasive forces that it need not be incorporated inside or between other layers. The spunbond layer is constructed from one or more polymers capable of providing a porous, structural support for the filter media preferably without substantially increasing the pressure drop across the media. By way of example, the spunbond layer may be constructed from bicomponent filaments of side-by side polypropylene and polyethylene, although other components and arrangements may be used.

A composite polymeric material or articles of the present invention comprise a polymeric matrix and a ferroelectric material distributed therein. As used herein a "polymeric matrix" means a surrounding or pervading element within which additional material or materials (e.g. ferroelectric material) is contained. The polymeric matrix comprises (a) a first thermoplastic polymer component and (b) a second thermoplastic polymer component.

The first thermoplastic polymer component desirably comprises a blend of (a) isotactic polypropylene and (b) syndiotactic polypropylene. Without being held to a particular theory of how the invention works, it is believed that the syndiotactic polypropylene provides a desired amount of tackiness or adhesion for the composite polymeric material while the isotactic polypropylene provides increased ability to process and reduce fiber size during drawing, aids in electret formation and mitigates the adhesion to a level that will prevent roll blocking. As a particular example, isotactic polypropylene may be obtained from ExxonMobil Chemical Company of Houston, Tex. sold as PP3155. Similarly, syndiotactic polypropylene may be obtained from Atofina Petrochemicals USA of LaPorte, Tex. as FINAPLAS 1751 or Total Petrochemicals as TOTAL Polypropylene 1751. By way of example, the first thermoplastic polymer component is desirably present in the composite polymeric material in an amount of from about 75% to about 98% of the total weight of the composite and even more desirably comprises from about 85% to about 95% of the composite and still more desirably comprises from about 88% to about 92% of the composite. By way of further example, the ratio on a weight basis of syndiotactic polypropylene to isotactic polypropylene in the composite polymeric material is desirably from about 3:1 to about 1:1, or desirably from about 2:1 to about 1:1, or still more desirably from about 1.5:1 to about 1:1. In still another example of the present invention, the syndiotactic polypropylene is desirably present in the composite polymeric material in an amount of from about 30% to about 90% of the total -weight of the composite, or desirably from about 40% to about 80%, or still more desirably from about 50% to about 60%.

The second thermoplastic polymer component comprises polymers having one or more polar functional units or groups. Preferably, the second thermoplastic polymer comprises a telomer or telechelic polymer. As used herein, "telechelic" polymer or "telomer" comprise polymers having one or more functional groups located at the chain ends of the polymer. The telomer can be a homopolymer, copolymer, terpolymer, or other composition. However, with copolymers or other polymers with a plurality of repeat units, the terminal or end functional groups of the telomers do not have the same chemical functionality as the repeat units. Telomers can have either one or a plurality of functional end groups and the average number of functional end groups for a given telomer will vary with the method of formation, degree of chain branching, and other factors known to those skilled in the art. The telomer is desirably present in an amount of from about 0.1% to about 25% of the total weight of the composite and even more desirably comprises from about 0.5% to about 15% of the composite and still more desirably comprises from about 1% to about 10% of the composite. In a further aspect of the invention, the functional end groups desirably comprise a weight percent of between about 0.0004% and about 0.2% and even more desirably between 0.002% and 0.1% by weight of the total polymeric portion of the composite. In addition, the second thermoplastic polymer component can comprise one or more distinct polymers.

Desirably, the telomer has a chain or backbone which is substantially similar to that of the first thermoplastic polymer component and even more desirably identical to that of the first thermoplastic polymer components. The functional end groups are desirably end groups capable of hydrogen bonding or undergoing a reaction, such as a condensation reaction, to form a covalent bond. Generally, polar functional groups are desirable such as, for example, an aldehyde, acid halide, acid anhydrides, carboxylic acids, amines, amine salts, amides, sulfonic acid amides, sulfonic acid and salts thereof, thiols, epoxides, alcohols, acyl halides, and derivatives thereof. Particularly preferred telomers include, but are not limited to, acid anhydride, carboxylic acid, amides, amines, and derivatives thereof.

Telomers and telechelic polymers are known in the art and various telomers and methods of making the same are described in Encyclopedia of Polymer Science and Engineering, vol. 16, pg. 494-554 (1989); the particular method utilized in making the telomer is not believed critical to practicing the present invention. As an example, telomers can be made by reactive grafting. In this regard, the desired polymer chains can be broken by peroxide cracking in the presence of the selected functional end group monomer. Peroxide cracking generates a free radical chain end that reacts with the functional groups and which thereby becomes the terminal or end group of the polymer chain. As particular examples, polyolefin-anhydride telomers (a polyolefin polymer having one or more anhydride end groups) suitable for use with the present invention are commercially available from Chemtura Corp. of Middlebury, Conn. under the trade name POLYBOND, such as POLYBOND 3200.

It is believed the second thermoplastic polymer component can also comprise random or block copolymers of two or more ethylinically unsaturated monomers, wherein one or more of the monomers possesses a polar functional group. As a particular example, the polar thermoplastic polymer can comprise copolymers of an olefin and a polar repeat unit such as, for example, copolymers of ethylene/acrylic acid as described in U.S. Pat. No. 5,817,415 to Chou. In addition, it is believed the second thermoplastic polymer component can comprise a non-polar polymer modified to include a polar functional group such as, for example, a polyolefin polymer randomly grafted to include a polar functional group. As particular examples, the second polyolefin polymer can comprise a polypropylene polymer backbone randomly grafted with a carboxylic acid as described in U.S. Pat. No. 4,626,263 to Inoue et al. and U.S. Pat. No. 5,409,766 to Yuasa et al. Copolymers or backbone grafted polymers, such as those described immediately above, tend to be incompatible with the first thermoplastic polymer due to the size and chemical nature of the functional groups positioned along the polymer backbone. Thus, grafted polymers of this type can form discrete phases or regions and are likened to biconstituent polymers which do not have a single or substantially homogeneous phase and instead usually form fibrils or protofibrils which start and end at random. Thus, the polymeric matrix may itself comprise a multi-phase material having discrete domains of the second polymer component distributed within a continuous phase of the first thermoplastic polymer component.

The second thermoplastic polymer component is desirably blended with the first thermoplastic polymer component in a manner designed to achieve a mixture or blend. As one example, the polymers can be blended using a master batch or dry blend technique. In this regard, the respective polymers are initially blended to form a master batch, typically in the form of pellets, prills or powder, having a higher weight percent of the second thermoplastic polymer component than ultimately desired in the polymeric matrix. The master batch is then mixed with pellets comprising the first thermoplastic polymer component and processed through a single-screw or multi-screw extruder. The ratio of the master batch and first thermoplastic polymer component is selected, based upon the weight percent of second thermoplastic polymer in the master batch, to achieve the desired ratio of first and second polymers. Where the mixture will be manufactured into a nonwoven material, additional components may added to the blend as processing aids.

As one example, peroxides may be added to decrease the melt viscosity of the blend. One such peroxide is 1,3 bis(tert-butyl peroxy-isopropyl)benzene available from Polyvel Inc. of Hammonton, N.J. as CR10PX2. Particularly where it is desired to form the polymeric matrix in the form of very fine fibers, such as meltblown fibers or a meltblown web, it will be desirable for the as-extruded viscosity of the polymeric component(s) included in the polymeric matrix to be in the range of about 400 to about 2000 g/10 min. More particularly, for meltblown applications, the viscosity may desirably be in the range of about 800 to about 1600 g/10 min. As stated above, the melt flow rate, a measure of the viscosity of the polymer expressed as the mass of material flowing from a capillary of known dimensions under a specified load or shear rate during a measured period of time, may be tested according to ASTM D-1238, and more particularly, measured at a specified temperature such as, for example, 177° C. as determined in accordance with test ASTM-D-1238-01, "Standard Test Method for Flow Rates of Thermoplastic By Extrusion Plastometer," and by using, for example, a Model VE 4-78 Extrusion Plastometer available from Tinius Olsen Testing Machine Co., Willow Grove, Pa.

Generally speaking, production of finer fibers such as meltblown fibers is facilitated by having the polymeric component or components, as extruded, having a higher rather than a lower melt flow. As mentioned above, there are available syndiotactic and isotactic polypropylene polymers having melt flow rates about 20 and 36 g/10 min., respectively. As mentioned, the extruded melt viscosity of these polymers may be reduced (i.e., their melt flow rates increased) using one or more peroxides. Further information regarding peroxide addition to polymer pellets may be found in U.S. Pat. No. 4,451,589 to Morman et al., and improved barrier microfiber nonwoven webs which incorporate peroxides in the polymer are disclosed in U.S. Pat. No. 5,213,881 to Timmons et al. The amount and type of peroxides, if used, will be dependent on factors such as the desired overall melt viscosity or melt flow rate of the polymeric components included in the polymeric matrix, the individual starting melt flow rates of the individual polymeric components making up the matrix, the relative amounts of the individual polymeric components, etc.

In addition, or alternatively, high melt flow rate polymers have become available which have high melt flow rates as-produced, that is, without the need of adding prodegradants such as peroxides to degrade the polymer to decrease viscosity/increase melt flow rate. Thus, these high melt flow rate polymers are able to produce fine fibers such as fine meltblown fibers without the use of prodegradants. Suitable high melt flow rate polymers can comprise polymers having a narrow molecular weight distribution and/or low polydispersity (relative to conventional olefin polymers such as those made by Ziegler-Natta catalysts) and include those catalyzed by "metallocene catalysts", "single-site catalysts", "constrained geometry catalysts" and/or other like catalysts. Exemplary polymers having a high melt flow rate, narrow molecular weight distribution and low polydispersity are described, by way of example only, in U.S. Pat. No. 5,736,465 to Stahl et al. and are available from the ExxonMobil Chemical Company, Houston, Tex., under the trade name ACHIEVE. Finally, it should be noted that other blending techniques and/or other processing aides are also believed suitable for use with the present invention.

The particular composition of each of the components of the composite polymeric material will vary with respect to the chosen process for making the abrasion resistant layer. As an example, the desired polymer rheology is different for those used for making films as opposed to fibers and further, with respect to fiber forming processes, the desired polymer composition and rheology differs for polymers used for making spunbond fibers and those for making meltblown fibers. The desired polymer composition and/or rheology for a particular manufacturing process will be known to those skilled in the art using the teachings disclosed herein.

In addition, the composite polymeric material also comprises a ferroelectric material. The term "ferroelectric material" is used herein to mean a crystalline material which possesses a spontaneous polarization which may be reoriented by the application of an external electric field. The term includes any phase or combination of phases exhibiting a spontaneous polarization, the magnitude and orientation of which can be altered as a function of temperature and externally applied electric fields. The term also is meant to include a single ferroelectric material and mixtures of two or more ferroelectric materials of the same class or of different classes. The term further includes a "doped" ferroelectric material, i.e., a ferroelectric material which contains minor amounts of elemental substituents, as well as solid solutions of such substituents in the host ferroelectric material. Ferroelectric materials exhibit a "Curie point" or "Curie temperature," which refers to a critical temperature above which the spontaneous polarization vanishes. The Curie temperature often is indicated herein as "$T_c$."

Examples of ferroelectric materials include, without limitation, perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, colemanite, and thiourea. Thus, ferroelectric materials may be inorganic or organic in nature. Inorganic ferroelectric materials are desired because of their generally superior thermal stability. Examples of various exemplary ferroelectric materials are discussed below.

Perovskites are a particularly desirable ferroelectric material due to their ability to form a wide variety of solid solutions from simple binary and ternary solutions to very complex multicomponent solutions. Some examples include, but are not limited to, $BaSrTiO_3$, $BaTiO_3$, $Pb(Co_{0.25}Mn_{0.25}W_{0.5})O_3$, and numerous forms of barium titanate and lead titanate doped with niobium oxide, antimony oxide, and lanthanum oxide, to name a few by way of illustration only. The ability to form extensive solid solutions of perovskite-type compounds allows one skilled in the art to systematically alter the electrical properties of the material by formation of a solid solution or addition of a dopant phase. In addition, perovskite-related octahedral structures have a structure similar to that of perovskites, and are likewise exemplary ferroelectric materials, examples include, but are not limited to, lithium niobate ($LiNbO_3$) and lithium tantalate ($LiTaO_3$). These materials are intended to be included in the term "perovskites." Additionally, a further example of ferroelectric materials include bismuth oxide layered materials which comprise complex layered structures of perovskite layers interleaved with bismuth oxide layers. An exemplary bismuth oxide layered compound is lead bismuth niobate ($PbBiNb_2O_9$). A more detailed description of suitable ferroelectric materials is provided in commonly assigned U.S. Pat. No. 5,800,866 to Myers et al., the entire contents of which are incorporated herein by reference.

The amount of ferroelectric material contained in the composite material is preferably within the range of from about 0.01 to about 50 percent by weight of the composite. Desirably, the amount of ferroelectric material within the composite is between about 0.05 to about 30 percent by weight and more desirably between about 0.1 to about 20 percent by weight of the composite and, still more desirably, between about 0.5 to about 5 percent by weight of the composite. On a percent by volume basis, the amount of ferroelectric material present in the composite generally will be in a range of from about 0.001 to about 13 percent by volume and desirably from about 0.01 to about 8 percent by volume and more desirably from about 0.1 to about 5 percent by volume and still more desirably from about 0.1 to about 2 percent by volume of the composite. Desirably the ferroelectric material is dispersed within the composite or matrix as described herein below.

The composite polymeric material comprises a polymeric matrix with the ferroelectric material dispersed therein. The ferroelectric material can be located randomly throughout the polymeric matrix and, desirably, is substantially uniformly distributed throughout the polymeric matrix. In this regard, the composite desirably comprises a zero/three composite. As used herein a "zero/three" composite refers to the dimensional connectivity of the ferroelectric material and the polymer comprising the composite. Connectivity is a macroscopic measure of the composite structure which considers the individual structures (i.e. the ferroelectric material and the polymer) continuity in the x, y, and z dimensions. The first number refers to continuity of the ferroelectric material within the composite and a zero rating indicates that the ferroelectric particles form discrete phases which are discontinuous in the x, y and z dimensions. The second number refers to the continuity of the polymeric portion of the composite and a three rating indicates that the polymeric portion of the composite is continuous in each of the x, y and z dimensions.

In addition, the desired particle size of the ferroelectric material will vary with respect to the particular manufacturing process (e.g. meltblown, spunbond, film and so forth) as well as the desired physical attributes of the article made therefrom. For example, with respect to melt extruded fibers or filaments, the longest dimension of the particles typically should be no greater than about 50 percent of the diameter of the orifice through which the composite is extruded. Desirably, the ferroelectric material has a longest dimension in a range of from about 10 nanometers to about 10 micrometers. It has been found that many nonwoven fiber forming processes inherently orient the ferroelectric particle such that the longest dimension of the particle is oriented substantially parallel with the machine direction of the fabric (i.e. the direction in which the fabric is produced) and thus a wide range of particle sizes are suitable for use in such materials. The longest dimension of the average ferroelectric particle is desirably less than about 2 micrometers and/or desirably less than about 50% of the fiber thickness. In addition, the ferroelectric material can comprise nano-size particles. Suitable ferroelectric materials can be synthesized to form particles of the desired size and/or can be destructured to form particles of the desired size. The term "destructured" and variations thereof means a reduction in size of the ferroelectric particles.

The composite polymeric material can be formed and processed by one of various methods. As an example, the composite polymeric material may be formed by the following process: (i) destructuring the ferroelectric material in the presence of a liquid and a surfactant to give destructured particles, wherein the liquid is a solvent for the surfactant and the surfactant is chosen to stabilize the destructured particles against agglomeration; (ii) forming a composite of the stabilized, destructured ferroelectric material particles and polymeric components; and (iii) extruding the composite material to form fibers, film or other materials as desired. A mixture of the stabilized, destructured ferroelectric material particles and a thermoplastic polymer may be prepared by a variety of methods. As specific examples, methods of making such materials are described in U.S. Pat. No. 5,800,866 to Myers et al. and European Patent Application Publication No. 0902851-A1, each of which is incorporated here by reference.

The composite polymeric material can be processed by one of various means to form the desired structure including, but not limited to, melt extrusion, solution spinning, gel spinning, extrusion cast films, blown films, and so forth. Desirably, the composite is made into a porous substrate or sheet. Examples of suitable media into which the composite polymeric material may be processed, include, but are not limited to, striated or fibrillated films, woven fabrics, reticulated foams, nonwoven webs, sintered porous materials and the like. Various nonwoven webs and laminates thereof, such as those described below, are particularly well suited for use as filtration media and wipes.

The composite polymeric material may also be processed into a staple fiber webs, such as air-laid or bonded/carded webs. An exemplary staple fiber web is described in U.S. Pat. No. 4,315,881 to Nakajima et al.; the entire content of which is incorporated herein by reference. Staple fibers comprising the composite polymeric material can comprise a portion of or all of the staple fibers within the staple fiber web. As still further examples, additional media into which the composite polymeric material may be processed or used with include multilayer laminates. As used herein "multilayer nonwoven laminate" means a laminate comprising one or more nonwoven layers such as, for example, wherein at least one of the layers is a spunbond fiber web and/or at least one of the layers is a meltblown fiber web. As a particular example, an exemplary multilayer nonwoven laminate comprises a spunbond/meltblown laminate. Such a laminate may be made by sequentially depositing onto a moving forming belt a first spunbond fabric layer and then a meltblown fabric layer. Examples of multilayer nonwoven laminates are disclosed in U.S. Pat. No. 5,721,180 to Pike et al., U.S. Pat. No. 4,041,203 to Brock et al., U.S. Pat. No. 5,188,885 to Timmons et al. and U.S. Pat. No. 5,482,765 to Bradley et al.; the entire contents of which are incorporated herein by reference. The composite polymeric material can comprise fibers in one or more of the layers of a multilayer laminate. Other media suitable for use with the present invention include, by way of further examples, filtration media described in U.S. Pat. Nos. 4,588,537 and RE 32,171. In one particular example, the present invention includes a meltblown fiber constructed from the composite polymeric material as described above. The meltblown fiber is then applied to a spunbond. For this particular example of the present invention, the spunbond is constructed from a side-by-side, bi-component filament of 50% polypropylene and 50% polyethylene, and the spunbond layer may have a basis weight of 1.4 osy (ounces per square yard) for this particular exemplary embodiment. Such is provided by way of example only; the range of substrate materials onto which the meltblown could be formed is not limited to the particular material type.

The composite polymeric material or the media into which it is processed may be electret treated so as to exhibit an electrostatic charge or field. As previously discussed, electrostatically charging the material can improve the filtration efficiency of the material. Various electret treatment techniques are known in the art and it is not believed that the method of electret treatment of the media is critical to the present invention and that numerous methods of electret treatment are suitable for use with the present invention. Suitable electret treating processes include, but are not limited to, plasma-contact, electron beam, corona discharge and so forth. Electrical or corona poled treatments can be applied either during and/or after the film formation or fiber spinning process. As examples thereof, methods for treating materials to form electrets are disclosed in U.S. Pat. No. 4,215,682 to Kubic et al., U.S. Pat. No. 4,375,718 to Wadsworth et al., U.S. Pat. No. 4,588,537 to Klaase et al., U.S. Pat. No. 4,592,815 to Makao, and U.S. Pat. No. 5,401,446 to Tsai et al.; the entire contents of the aforesaid patents are incorporated herein by reference.

As one example, a filter or air-masking media can be charged or electretized by sequentially subjecting the material, such as a nonwoven web constructed from the composite polymeric material, to a series of electric fields such that adjacent electret fields have opposite polarities with respect to one another. For example, a first side of the web is initially subjected to a positive charge while the second or opposed side is subjected to a negative charge, and then the first side is subjected to a negative charge and the second side to a positive charge thereby imparting permanent electrostatic charges in the material. A suitable method of electrostatically polarizing a polymeric material such as a nonwoven web is illustrated in FIG. 1. Polymeric sheet 12, having first side 14 and second side 16, is received by electret treatment apparatus 20. Polymeric sheet 12 is directed into apparatus 20 with second side 16 in contact with guiding roller 22. First side 14 of sheet 12 comes in contact with first charging drum 24, having a negative electrical potential, while second side 16 of sheet 12 is adjacent first charging electrode 26, having a positive electrical potential. As sheet 12 passes between first charging drum 24 and first charging electrode 26, electrostatic charges develop therein. The polymeric sheet 12 is then passed between second charging drum 28 and second charging electrode 30. Second side 16 of sheet 12 comes in contact with second charging drum 28, having a negative electrical potential, while first side 14 of sheet 12 is adjacent second charging electrode 30, having a positive electrical potential. The second treatment reverses the polarity of the electrostatic charges previously imparted within the web and creates a permanent electrostatic charge therein. The polarities of the charging drums and electrodes could be reversed. The electretized sheet 18 can then be passed to second guiding roller 32 and removed from electret treatment apparatus 20. Additionally, other devices or apparatus could be utilized in lieu of those discussed in reference to FIG. 1.

Composite polymeric materials or the media into which they have been processed can be used to make a variety of products and/or articles when further processed into an electret material as described above. As previously mentioned, filtration or filter media serve as examples. As used herein the term "filtration" or "filter" media can refer to fabrics which provide a desired level of barrier properties and is not limited to the strict or narrow definition of a filter which requires entrapment of particles. Thus, filter media of the present invention can be used in air and gas filtration media such as, for example, those used in HVAC filters, vacuum cleaner bags, respirators, air filters for engines, air filters for cabin air filtration, heating and/or air conditioner filters, and so forth. Additionally, the filter media of the present invention can also be utilized in infection control products such as, for example, medically oriented items such as face masks, wound dressings, sterilization wraps and the like. As a particular example, exemplary sterilization wraps and face masks are described in U.S. Pat. No. 4,969,457 to Hubbard et al., U.S. Pat. No. 5,649,925 to Reese et al., and U.S. Pat. No. 5,635,134 to Bourne et al., the entire contents of the aforesaid references are incorporated herein by reference. Further, electret filter media can be utilized in hand wipes and other similar applications. In this regard, the electret media can be particularly adept at picking up lint, dust and other fine particulate matter. Polymeric electret materials can comprise or be incorporated as a component within in a wide variety of articles. Furthermore, composite polymeric materials or the media into which they have been processed can be used to make a variety of products without being processed into an electret material as well. By way of example, the composite polymeric materials could be used to create various liquid filter media including media for water filtration.

Tests

Air Permeability Measurements: A measure of the permeability of a fabric or web to air is the Frazier Permeability which is performed according to Federal Test Standard No. 191A, Method 5450 dated Jul. 20, 1978, and is reported as an average of 3 sample readings. The air permeability of the substrates discussed below were evaluated using a Texttest AG (Schwerzenbach, Switzerland) Model 3300 Air Permeability Tester (APT). The Model 3300 APT measures the rate of air flow through a known area of filtration media. More specifically, the APT uses a variable orifice to measure the air flow through a test specimen. The air permeability is determined from the pressure drop across this orifice. For these tests, a test pressure of 125 Pa was used with a test head area of 38 $cm^2$. The air permeability of a filter medium is expressed as volume of flow per unit surface area of filter media—i.e. as $cfm/ft^2$ (cubic feet of air per minute per square foot of filter media).

Air Filtration Measurements: The air filtration efficiencies of the substrates discussed below were evaluated using a TSI, Inc. (St. Paul, Minn.) Model 8130 Automated Filter Tester (AFT). The Model 8130 AFT measures pressure drop and particle filtration characteristics for air filtration media. The AFT utilizes a compressed air nebulizer to generate a polydisperse aerosol of aqueous sodium chloride droplets which are then separated by size through the use of an impingement device and are subsequently dried to form solid sodium chloride particles which serve as the challenge aerosol for measuring filter performance. The challenge aerosol is characterized by having a count mean diameter of 0.075 μm and a mass mean diameter of 0.26 µm. Typical air flow rates were between 84.5 liters per minute and 85.5 liters per minute. The AFT test was performed on a sample area of about 97.9 cm². The performance of a filter medium can be expressed as the percentage of sodium chloride particles which penetrate the filter. Penetration is defined as transmission of a particle through the filter medium. The concentration of transmitted particles was detected downstream from the filter and was compared to the concentration upstream of the filter. The percent penetration (% P) reflects the ratio of the downstream particle-concentration to the upstream particle concentration and a lower number is generally more desirable. Light scattering photometry was used for the detection of the sodium chloride particles. The percent efficiency ∈ may be calculated from the percent penetration according to the formula:

∈=100−% $P$

Gurley Stiffness: The Gurley Stiffness test measures the bending resistance of a material. It is carried out according to TAPPI Method T 543 om-94 and is measured in milligrams and reported as an average of 5 sample readings. The sample size used for the testing herein was 1.5 inch (3.8 cm) in the MD by 1 inch (2.54 cm) in the CD.

EXAMPLES

Various blends of the polymeric composite materials were prepared. The ability to process a given composition into a meltblown fiber was determined subjectively. The stability of a charge placed upon a sheet of the resulting meltblown fiber by electret treatment was also determined for some of the compositions. Table 1 lists these results (in all examples, w/w means the percentages provided are on the basis of weight). From these results, filter media were prepared as set forth in the specific examples that follow Table 1. Following these examples, Table 2 sets forth the comparative results of these specific examples.

tic component, SCC-24804 (10% barium titanate concentrate pellet available from Standridge Color Corp. of Social Circle, Ga.) was used for the ferroelectric, POLYBOND 3200 (Chemtura Corp. of Middlebury, Conn.) was used for the telomer, and POLYVEL CR10PX2 (Polyvel Inc. of Hammonton, N.J.) was used for the processing aid.

Example A (Comparative)

A filter media was constructed from a previously produced meltblown layer that was unwound between two layers of low loft bicomponent spunbond. The resulting three layer "stack" of materials was through-air bonded, thereby forming a three layer composite filter media. The media was then electret treated and wound into roll form. The meltblown weighed 0.53 osy and was produced from polypropylene polymer (Basell PF-015 available from Basell North America, Inc. of Elkton, Md.) containing 5% maleic anhydride telomer (Polybond 3200 available from Chemtura Corp. of Middlebury, Conn.), 0.5% $BaTiO_3$ (added as 5 weight % of SCC-24804 available as a concentrate pellet containing 10% $BaTiO_3$ in isotactic polypropylene from Standridge Color Corp. of Social Circle, Ga.), and approximately 1% $TiO_2$ concentrate (SCC-4837 available from Standridge Color Corp.). The outer spunbond layers were produced from polypropylene (3155 available from ExxonMobil Chemical Company of Houston, Tex.) and polyethylene (XUS61800.41 available from Dow Chemical Corp. of Midland, Mich.) in a side-by-side fiber configuration. Each spunbond layer weighed approximately 1.44 osy.

Example B

A filter media was constructed from a composite polymeric material according to an exemplary embodiment of the present invention by unwinding a previously produced 3 osy low loft bicomponent spunbond beneath a meltblown die

TABLE 1

| Blend | Syndiotactic PP (% w/w) | Isotactic PP (% w/w) | Ferro-electric (% w/w) | Telomer (% w/w) | Process aid (% w/w) | Processibility | Comments |
|---|---|---|---|---|---|---|---|
| 1 | 91 | 0 | 4.5 | 4.5 | 0 | Negative | Viscosity too high. |
| 2 | 58 | 39 | 0 | 0 | 3 | Positive | Good Adhesion. (Blend check without additives) |
| 3 | 54 | 36 | 5 | 5 | 0 | Negative | Viscosity too high |
| 4 | 52 | 35 | 5 | 5 | 3 | Positive | Good Adhesion |
| 5 | 48.5 | 48.5 | 0 | 0 | 3 | Positive | Lower Adhesion than B & D. (Blend check without additives) |
| 6 | 43.5 | 43.5 | 5 | 5 | 3 | Positive | Lower Adhesion than B&D |
| 7 | 48.5 | 48.5 | 0 | 0 | 3 | Positive | Lower Adhesion than B & D. (Blend check without additives) |
| 8 | 43.5 | 43.5 | 5 | 5 | 3 | Positive | Lower Adhesion than Blends B & D |
| 9 | 53.5 | 33.5 | 5 | 5 | 3 | Positive | Good Adhesion. Poor Electret Stability. |
| 10 | 54.5 | 34.5 | 5 | 5 | 1 | Positive | Good Adhesion. Good Electret Stability. |

Blends A through J utilized EXXONMOBIL 3155 polypropylene (ExxonMobil Chemical Company of Houston, Tex.) as the isotactic component, FINAPLAS 1751 (Atofina Petrochemicals USA of LaPorte, Tex.) for the syndiotacwhich was forming meltblown fibers from a blend of polymers comprising 54.5% (w/w) syndiotactic polypropylene (Finaplas 1751 available from Atofina Petrochemicals USA of LaPorte, Tex.), 34.5% (w/w) isotactic polypropylene (3155 available from the ExxonMobil Chemical Company of Houston, Tex.), 5% (w/w) maleic anhydride telomer (Polybond 3200 available from Chemtura Corp. of Middlebury, Conn.), 0.5% BaTiO$_3$ (added as 5 weight % of SCC-24804 available as a concentrate pellet containing 10% BaTiO$_3$ in isotactic polypropylene from Standridge Color Corp. of Social Circle, Ga.), and 1% (w/w) peroxide concentrate (CR10PX2 available from Polyvel, Inc. of Polyvel Inc. of Hammonton, N.J.). The weight of the meltblown that was added to the spunbond layer was 0.43 osy. Following the addition of the meltblown to the bicomponent spunbond, the resultant 2 layer composite media was electret treated and wound into roll form.

Example C (Comparative)

A filter media was constructed in a manner similar to that of Example A, except the spunbond layer weighed approximately 1.24 osy.

Example D

A filter media was constructed from a composite polymeric material according to an exemplary embodiment of the present invention by preparing the same media as described in Example B, except the weight of the meltblown that was added to the spunbond layer was 0.32 osy.

Example E (Comparative)

A filter media was constructed in a manner similar to that of Example A, except the spunbond layer weighed approximately 1.04 osy.

Example F

A filter media was constructed from a composite polymeric material according to an exemplary embodiment of the present invention by preparing the same media as described in Example B, except the weight of the meltblown that was added to the spunbond layer was 0.20 osy.

TABLE 2

| Example | Basis Weight (o.s.y.) | Stiffness (mg) | Meltblown Weight (o.s.y.) | # Component Layers in Composite | Air Permeability (cfm/sq. ft.) | Particle Penetration (%) | Layer Adhesion/Abrasive Resistance |
|---|---|---|---|---|---|---|---|
| A | 3.4 | 340 | 0.53 | 3 | 73 | 20 | P |
| B | 3.4 | 345 | 0.43 | 2 | 129 | 18 | G |
| C | 3 | 283 | 0.53 | 3 | 69 | 21 | P |
| D | 3.3 | 345 | 0.32 | 2 | 166 | 22 | G |
| E | 2.6 | 200 | 0.53 | 3 | 77 | 22 | P |
| F | 3.2 | 345 | 0.20 | 2 | 178 | 26 | G |

The data represented in Table 1 illustrates, for example, that increasing the amount of syndiotactic polypropylene relative to the amount of isotactic polypropylene contributes to the abrasion resistance and adhesiveness of the resulting meltblown material. In addition, the addition of a processing aid, such as a peroxide, can increase processability of the composite polymeric material but can also reduce the effectiveness of the material as an electret if too much is added. The data represented in Table 2 illustrates, for example, that the composite polymeric material of the present invention can be used to create a filtration media from only two layers (spunbond/meltblown) that will still exhibit a filtration efficiency comparable to the three layer media, which is more expensive to produce. Furthermore, such improved, two-layer filtration media has a substantially higher air permeability due in part to the removal of the extra spunbond layer. However, the removal of this extra layer does not sacrifice the media's stiffness and, therefore, its ability to retain a desired filter shape. Table 2 also illustrates that, using the polymeric composite material of the present invention, such beneficial results can be still be obtained with a reduced basis weight of meltblown material relative to the three-layer material in the comparative examples. It was also observed during manufacture that the two layer filtration media created from the polymeric composite material of the present invention exhibits good adhesion and resistance to abrasion during processing without significant blocking problems.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover or encompass all such modifications, alterations and/or changes.

What is claimed is:

1. A filtration media, comprising:
    a support layer;
    an exterior layer adhered to said support layer, said exterior layer constructed from a polymeric matrix that comprises a first polymer component, wherein said first polymer component comprises a blend of syndiotactic polypropylene and isotactic polypropylene, wherein the weight ratio of said syndiotactic polypropylene to said isotactic polypropylene in said polymeric matrix is greater than 1 to 1, said polymer matrix further comprises a second polymer component, wherein said second polymer component comprises a telomer having at least one functional end group; and
    a ferroelectric material dispersed throughout said polymeric matrix in an amount of between about 0.01% and about 50% by weight of said matrix.

2. The filtration media of claim 1, wherein said weight ratio is at least about 1.5 to 1.

3. The filtration media of claim 1, wherein said first polymer component comprises from about 75% to about 98% by weight of said polymeric matrix.

4. The filtration media of claim 1, wherein said exterior layer comprises a meltblown fiber web constructed from said polymeric matrix.

5. The filtration media of claim 1, wherein said ferroelectric material comprises a perovskite.

6. The filtration media of claim 1, wherein said ferroelectric material is selected from the group consisting of barium titanate, barium strontium titanate, lead titanate, and combinations thereof.

7. The filtration media of claim 1, wherein said support layer comprises a spunbond web comprising bicomponent filaments of polypropylene and polyethylene.

8. The filtration media of claim 1, wherein said at least one functional end group of said telomer is selected from the group consisting of aldehyde, acid halide, acid anhydrides, carboxylic acids, amines, amine salts, amides, sulfonic acid amides, sulfonic acid and salts thereof, thiols, epoxides, alcohols, acyl halides, and derivatives thereof 9. The filtration media of claim 1, wherein said support layer and said exterior layer are electret treated.

10. An electret material, comprising:
a porous sheet having an electrostatic charge and comprising a polymeric matrix; said polymeric matrix comprising (i) a first polymer component, wherein said first polymer component comprises a blend of syndiotactic polypropylene and isotactic polypropylene in a weight ratio of greater than 1 to 1; and (ii) a second polymer component blended with said first polymer component, wherein said second polymer component comprises a telomer having at least one functional end group; and
a ferroelectric material dispersed throughout said polymeric matrix.

11. The electret material of claim 10, wherein said at least one functional end group is selected from the group consisting of aldehyde, acid halide, acid anhydrides, carboxylic acids, amines, amine salts, amides, sulfonic acid amides, sulfonic acid and salts thereof, thiols, epoxides, alcohols, acyl halides, and derivatives thereof.

12. The electret material of claim 10, wherein said ferroelectric material comprises a perovskite.

13. The electret material of claim 10, wherein said porous material comprises a nonwoven web.

14. The electret material of claim 10, wherein said porous material is selected from the group consisting of fibrillated films, sintered films, porous films, woven fabrics, foams, nonwoven webs and multilayer laminates thereof.

15. A face mask comprising the electret material of claim 10.

16. A sterilization wrap comprising the electret material of claim 10.

17. A dust wipe comprising the electret material of claim 10.

18. An airfilter media comprising the electret material of claim 10.

19. An air filter media comprising a spunbond/meltblown laminate, wherein the meltblown is placed on a downstream side the air filter media and comprises the electret material of claim 9.

20. The filtration media of claim 1, wherein said syndiotactic polypropylene is present in said polymeric matrix in an amount from about 50 percent to about 90 percent by weight of said matrix.

21. The filtration media of claim 1, wherein said syndiotactic polypropylene has a polydispersity index of from about 2.2 to about 3.5.

22. A filtration media, comprising:
a support layer;
an exterior layer adhered to said support layer, said exterior layer comprising a meltblown fiber web constructed from a polymeric matrix that comprises a first polymer component, wherein said first polymer component comprises a blend of syndiotactic polypropylene and isotactic polypropylene, said syndiotactic polypropylene being present in said polymeric matrix in an amount from about 30 percent to about 90 percent by weight of said matrix, said polymer matrix further comprises a second polymer component, wherein said second polymer component comprises a telomer having at least one functional end group; and
a ferroelectric material dispersed throughout said polymeric matrix in an amount of between about 0.01% and about 60% by weight of said matrix.

23. A filtration media, comprising:
a support layer comprising a spunbond web comprising bicomponent filaments of polypropylene and polyethylene;
an exterior layer adhered to said support layer, said exterior layer constructed from a polymeric matrix that comprises a first polymer component, wherein said first polymer component comprises a blend of syndiotactic polypropylene and isotactic polypropylene, said syndiotactic polypropylene being present in said polymeric matrix in an amount from about 30 percent to about 90 percent by weight of said matrix, said polymer matrix further comprises a second polymer component, wherein said second polymer component comprises a telomer having at least one functional end group; and a ferroelectric material dispersed throughout said polymeric matrix in an amount of between about 0.01 % and about 50% by weight of said matrix.

* * * * *

UNITED STATES PATENT AND TRADEMARK OFFICE
CERTIFICATE OF CORRECTION

PATENT NO. : 7,642,208 B2
APPLICATION NO. : 11/638862
DATED : January 5, 2010
INVENTOR(S) : Jeffrey Lawence McManus et al.

It is certified that error appears in the above-identified patent and that said Letters Patent is hereby corrected as shown below:

Column 18, line 30 (Claim 22) "about 60% by weight of said matrix." should read --about 50% by weight of said matrix.--

Signed and Sealed this

Sixteenth Day of February, 2010

David J. Kappos
*Director of the United States Patent and Trademark Office*